United States Patent [19]

Lehmann et al.

[11] Patent Number: 4,981,880

[45] Date of Patent: Jan. 1, 1991

[54] PROCESS FOR MAKING LOW DENSITY FLEXIBLE POLYISOCYANURATE-POLYURETHANE FOAMS

[75] Inventors: Christian M. Lehmann, Warendorf; Michael A. P. Gansow, Duesseldorf, both of Fed. Rep. of Germany

[73] Assignee: The Dow Chemical Company, Midland, Mich.

[21] Appl. No.: 452,856

[22] Filed: Jan. 24, 1990

Related U.S. Application Data

[63] Continuation of Ser. No. 248,710, Sep. 23, 1988, abandoned.

[51] Int. Cl.$^5$ .................... C08G 18/18; C08G 18/16; C08G 18/65
[52] U.S. Cl. ......................... 521/174; 521/118; 521/125; 521/176; 521/902
[58] Field of Search ............ 521/170, 173, 174, 176, 521/118, 125, 902

[56] References Cited

U.S. PATENT DOCUMENTS

| | | | |
|---|---|---|---|
| 3,405,077 | 10/1968 | Pastor et al. | 260/2.5 |
| 3,486,828 | 6/1967 | Nickell et al. | 356/199 |
| 3,875,086 | 4/1975 | Ramey et al. | 260/2.5 AM |
| 3,965,052 | 6/1976 | Iwasaki | 260/2.5 AW |
| 3,989,651 | 11/1976 | Lockwood et al. | 521/78 |
| 4,029,610 | 6/1977 | Narayan et al. | 260/2.5 BF |
| 4,101,456 | 7/1978 | Renaud et al. | 252/551 |
| 4,101,465 | 7/1978 | Lockwood et al. | 521/118 |
| 4,314,037 | 2/1982 | Beitchman et al. | 521/125 |
| 4,544,679 | 10/1985 | Tideswell et al. | 521/116 |
| 4,568,702 | 2/1986 | Mascioli | 521/112 |
| 4,596,665 | 6/1986 | Gonzalez et al. | 252/182 |
| 4,605,681 | 8/1986 | Grey et al. | 521/51 |
| 4,715,746 | 12/1987 | Mann et al. | 405/8.551 |
| 4,738,991 | 4/1988 | Narayan | 521/124 |

FOREIGN PATENT DOCUMENTS

| | | | |
|---|---|---|---|
| 787977 | 6/1968 | Canada | 400/6 |
| 2188055 | 3/1986 | United Kingdom . | |

OTHER PUBLICATIONS

J. H. Arceneaux et al., *J. Elastomers and Plastics,* vol. 14, p. 63 (1982).

*Primary Examiner*—John Kight, III
*Assistant Examiner*—Dennis R. Daley

[57] ABSTRACT

Low density flexible molded and slabstock foams are prepared by reacting a polyisocyanate with a polyol composition containing a mono-alcohol. The blowing of the foam is essentially with carbon dioxide generated from the reaction of water with isocyanate, and the reaction catalysts used in the preparation of the foam include a polyisocyanate trimerization catalyst.

12 Claims, No Drawings

PROCESS FOR MAKING LOW DENSITY FLEXIBLE POLYISOCYANURATE-POLYURETHANE FOAMS

CROSS REFERENCE TO RELATED APPLICATION

This is a continuation of application Ser. No. 248,710, filed 9/23/88, now abandoned.

FIELD OF INVENTION

This invention relates to flexible, molded and slabstock polyurethane foams and more particularly to a process for making unusually soft, flexible polyurethane foams of low density.

TECHNICAL BACKGROUND

The published literature contains numerous examples where the problem of reducing the volume requirement of Freon-11, blowing agent, has been addressed.

Replacement of the hard CFC by soft CFC's, such as for example, Freon R-21, R-22 and R-123 is taught by Patents JP No. 52/154,156-A, U.S. Pat. No. 4,636,529 A, and U.S. Pat. No. 4,076,644.

Complete replacement of the Freon-11 blowing agent by non-fluorocarbon blowing agents is taught for example by Japanese Patent No. J 55/094,296 A, whereby a combination of dichloromethane and water are used to blow the foam. Similarly, U.S. Pat. No. 4,264,744 A teaches the use of dichloromethane and selection of catalyst for replacing all or a part of the conventional fluorocarbon blowing agent in the preparation of soft foams.

U.S. Pat. No. 4,417,002 A teaches the use of carboxylic acids in combination with isocyanates to release a gas useful as a blowing agent in the preparation of flexible polyurethane foam.

All modifications taught to address the problem of replacing Freon-11 as blowing agent for polyurethane foams in general follow the pattern of directly substituting the Freon-11 by an alternative blowing agent. For example, foams can be prepared by blowing with water. The water reacts with isocyanate leading to the generation of carbon dioxide which then expands the reacting mixture to give the cellular structure of the polymer.

While water can be used as the only blowing agent, the foams produced do not always exhibit the desired physical properties in comparison to those produced using halocarbon blowing agents, and they are, for example, harder and of poorer resilience.

Mono-alcohols have been used to modify polyisocyanates which are then used in the preparation of polyurethanes. As an example, Japanese Patent JP No. 62/121,719 uses a mono-alcohol to modify a polyisocyanate composition used in the preparation of soft polyurethane foam in situations where heat adhesive properties to fibrous materials are required. Another example is the Patent GB No. 2,188,055 which teaches the preparation of hydrophilic polyurethane foams from 1,6-hexamethylene diisocyanate modified by reaction with a mono-alcohol.

Mono-alcohols have been incorporated into polyol compositions for the purpose of providing low viscosity formulations with good flow characteristics. U.S. Pat. No. 4,715,746 teaches a polyol composition containing mono-alcohols of molecular weight 32 to 600, especially tertiary butanol or isobutanol, to provide permanent strengthening of geological formations in underground workings or mines. Similarly in the French Patent No. 2,312,520 polyglycol monoethers are used as viscosity depressants of polyol compositions required in the preparation of rigid and semi-rigid polyurethane foam. The reduced viscosity of the polyol mixture permits the high pressure continuous casting machines to operate without overheating.

U.S. Pat. No. 3,405,077 teaches the use of monoalcohols of hydroxyl equivalent weight from 74 to 150 in combination with polyether polyols for the preparation of soft polyurethane foams by reaction with polyisocyanates in the presence of trichlorofluoromethane and water. Similarly Canadian Patent No. 787,977 teaches the use of low molecular weight mono-alcohols for preparing soft polyurethane foam in the presence of mainly trichlorofluoromethane as the blowing agent.

The preparation of flexible slabstock polyurethane foam with polyol compositions containing monohydroxy polyether polyols of equivalent weights up to 719 is taught by Arceneaux, *Journal of Elastomers and Plastics*, p. 63, Vol. 14 (1982). They note an improvement in elongation properties but observe unacceptable load bearing, tear resistance, and compressive and tensile strength properties of the foams.

It was therefore an object of this invention to define a process which reduces and/or essentially avoids the use of chlorofluorocarbon (CFC) blowing agents for the preparation of soft flexible polyurethane foam and provides products having good physical properties.

SUMMARY OF THE INVENTION

It has now been found that flexible foams of excellent quality and good physical properties can be prepared by a process comprising reacting polyisocyanates with a polyol composition containing at least two different hydroxyl-containing compounds in the presence of trimerization catalyst and blowing agent. At least one of the hydroxyl compounds is a polyol of hydroxyl number from 20 to 120 and at least one hydroxyl compound is a mono-alcohol. The major portion of the blowing of the foam results from the reaction of water and isocyanate.

The soft polyurethane foams thus prepared by reacting polyisocyanates with polyol compositions containing mono-alcohol compounds in the presence of trimerization catalysts and water as blowing agent exhibit foam properties comparable to those foams prepared using conventional polyol compositions and CFC blowing agents.

DETAILED DESCRIPTION OF THE INVENTION

The components utilized in the process for preparing the flexible polyurethane and polyisocyanurate foam in accordance with the present invention include a polyether mono-alcohol which is used optionally in admixture with at least one polyol, an organic polyisocyanate, catalysts, surfactant, blowing agent and other additives such as fillers, dyes, flame retardants, internal mold release agents, etc.

THE POLYETHER MONO-ALCOHOL

A mono-alcohol for the purpose of this invention is defined as a compound which has one active hydrogen as determined by the well-known Zerewitinoff test such as described by Kohler in the *Journal of the American Chemical Society*, p. 3181, Vol. 49 (1927).

Mono-alcohols can be prepared by reacting an initiator with an alkylene oxide. Examples of suitable initiators include aliphatic, cycloaliphatic or aromatic monohydric alcohols having 1 to 12 carbon atoms, and aliphatic, cycloaliphatic or aromatic ethers, of monoether glycols having 2 to 6 carbon atoms in the glycol moiety, and dimethyl, -ethyl, -propyl or -butyl ethers of triols such as glycerol and trimethylolpropane. The monohydric initiator may be employed separately or in combination with other monohydric initiators or optionally in combination with other polyol initiators, for example glycerine. The preferred monohydric initiators comprise, for example, methanol, ethanol, propanol, butanol, alkylene oxide adducts of methanol such as those sold under the trade names of Dowanol EM, Dowanol DM, Dowanol TPM, Dowanol PM, monoethers of di- and triethylene or -propylene glycols and such like.

The above monohydric initiators may be reacted with an alkylene oxide such as ethylene oxide, propylene oxide, 1,2-butylene oxide, 2,3-butylene oxide, styrene oxide and the like, or mixtures of two or more suitable oxides using techniques known to those skilled in the art of preparing polyether polyols. Suitable processes for the preparation of polyalkylene polyether polyols have been disclosed by Wurtz in 1859, *The Encyclopaedia of Chemical Technology*, Vol. 7, pp. 257–266, published by Interscience Publishers Inc. (1951) and U.S. Pat. No. 1,922,459. The preferred alkylene oxides reacted with the monohydric initiator comprise ethylene oxide, propylene oxide and butylene oxide. The alkylene oxides used in the reaction are employed separately or in combination in such quantities so as to obtain the desired molecular weight of polyether mono-alcohol. When oxides are used in combination, the distribution of oxide in the oxyalkylene chain of the product can be random or block manner or combination of either manner so as to provide products containing primary or secondary end hydroxyl groups.

The choice of catalyst used in the preparation of the polyether mono-alcohols is well-known to those skilled in the art of preparing polyether polyols. Preferred catalysts are compounds of the group I and group II metals of the Periodic Table comprising for example sodium hydroxide, potassium hydroxide, potassium methoxide and the like.

In one embodiment of this invention, the more suitable polyether mono-alcohols are those having a molecular weight of at least 800, preferably from 800 to 3000, and more preferably from 1000 to 2000. By way of illustration and not limitation, examples of such mono-alcohols are those which may be prepared by the reaction of triethylene glycol monomethylether with a mixed oxide feed comprising ethylene oxide from 5 to 15 percent by weight and at least 50 percent by weight propylene oxide to give a product with a molecular weight ranging from 1300 to 1500 and having essentially secondary hydroxyl groups. Triethylene glycol monomethylether may also be reacted with a mixed feed comprising ethylene oxide and at least 50 percent propylene oxide and then further reacted with from 1 to 10 percent by total weight of oxide, ethylene oxide to give a product of molecular weight ranging from 1400 to 1600 and containing approximately 20 to 60 percent primary hydroxyl groups.

Similarly, for example, a product may be prepared by reacting a mixed oxide feed comprising ethylene oxide and at least 50 percent by weight propylene oxide and then further reacting from 1 to 10 percent by total weight of oxide, ethylene oxide with an initiator mixture comprising the monohydric initiator diethylene glycol monomethylether and at least 50 percent by weight glycerine to give a product of molecular weight ranging from 1400 to 1600 and containing approximately 20 to 60 percent primary hydroxyl groups.

The polyether mono-alcohol component of the polyol composition is present in an amount sufficient to provide measurably softer foams than those prepared in the absence of the mono-alcohol component. The amount of polyether mono-alcohol that can advantageously be used is from 0.1 to 40, preferably from 10 to 30 and more preferably from 15 to 30 percent by weight of the total polyol composition comprising the mono-alcohol and polyol. Amounts larger than these may be used in preparing foams but can result in products with undesirable properties such as poor tear resistance. For the purpose of this invention, the mono-alcohol component of the polyol composition is defined as that component which is intentionally added in preparing the polyol composition and not that which may be present as an impurity in the polyol component.

THE POLYOL

Any of the polyols used in the preparation of flexible polyurethane foams can be employed in the practice of this invention. Suitable polyols are polyester polyols and addition products of alkylene oxides with polyhydric compounds having from 2 to 8 active hydrogens. Preferred polyols for this invention are polyether polyols having an hydroxyl number of 20 to 120. Examples of polyhydric compounds that are suitable as starting materials for making the addition products comprise water, glycerol, trimethylolpropane, pentaerythritol, hexanetriol, hexitol, heptitol, sorbitol, mannitol, sucrose and amine compounds, for example, ethylene diamine, aminoethylpiperazine and the like, and mixtures of 2 or more such compounds. The alkylene oxide adducts of the polyhydric initiator can be prepared using techniques well-known to those skilled in the art of preparing polyether polyols.

The polyol component of the polyol composition can comprise one or a plurality of polyols. It is preferred that the polyol composition comprises at least one polyether polyol which is nominally three functional. Optionally, the polyol composition may contain a polyether polyol that contains primary hydroxyl groups from at least 20 to 90, preferably at least 40 to 90 percent of its total hydroxyl content. A representative example of such a polyether polyol may be glycerine which is alkoxylated with one or a combination of alkylene oxides including ethylene oxide, in a block or random manner so as to provide a polyether polyol containing at least 20 to 90, and preferably from 40 to 90 percent primary hydroxyl content and having a hydroxyl number of from 20 to 120.

The polyol component is present in an amount from 60 to 99.9, preferably from 70 to 90 and more preferably from 70 to 85 percent by weight of the total polyol composition comprising polyol and mono-alcohol.

THE POLYISOCYANATE

The polyol composition is advantageously reacted with an organic polyisocyanate such that the ratio of isocyanate groups of the polyisocyanate to the active hydrogens or the polyol composition including the water is 0.8:1 to 1.3:1, and preferably from 0.9:1 to 1.25:1. At lower ratios of polyisocyanate inadequate curing is achieved and at higher ratios the desirable foam physical properties are not achieved. It is noted that the optimum amount of polyisocyanate varies somewhat with the prevailing weather conditions, particularly temperature and humidity. In conditions of high humidity, isocyanate consumption is greater and so slightly larger volumes of isocyanate are required to produce foams of good quality at a constant ratio.

Polyisocyanates which may be used include aromatic, aliphatic and cycloaliphatic polyisocyanates and combination thereof. Representative examples are diisocyanates such as m-phenylene diisocyanate, 2,4-toluene diisocyanate, 2,6-toluene diisocyanate, mixtures of 2,4-toluene diisocyanate and 2,6-toluene diisocyanate, hexamethylene diisocyanate, tetramethylene diisocyanate, 1,4-cyclohexane diisocyanate, hexahydrotoluene diisocyanate, 1,5-naphthalene diisocyanate, 1-methoxy-2,4-phenylene diisocyanate, 2,4-diphenylmethane diisocyanate, 4,4'-diphenylmethane diisocyanate and mixtures, 4,4'-biphenylene diisocyanate, 3,3'-dimethoxy-4,4'-biphenyl diisocyanate, 3,3'-dimethyl-4,4'-biphenyl diisocyanate, 3,3'-dimethyl-4,4'-diphenylmethane diisocyanate.

Polyisocyanates, prepolymers, including those modified prior to reacting with the polyol composition may also be employed within the scope of the invention. Especially useful due to their availability and properties are the toluene diisocyanates, 4,4'-diphenylmethane diisocyanate, 2,4'-diphenylmethane diisocyanate and polymethylene polyphenyl polyisocyanate, commonly referred to as "crude MDI." The preferred polyisocyanates can be used alone or in combinations when reacting with the polyol composition

THE CATALYSTS

The catalysts which may be used to make polyisocyanate-based foam are well-known. There are three general types of urethane catalysts: tertiary amines, organometallic compounds and salts of acids, preferably weak acids; which can be used to promote the reaction of isocyanate with an active hydrogen-containing compound. The catalysts may be active immediately or become active during the process of the reaction, for example, as a result of thermal decomposition by the reaction exotherm of a catalyst precursor; such catalysts are often referred to as being blocked or delayed-action catalysts. Examples of suitable tertiary amines, used either individually or in admixture, are the N-alkylmorpholines, N-alkylalkanolamine, N,N-dialkylcyclohexylamines and alkylamines where the alkyl groups are methyl, ethyl, propyl, butyl, etc. Examples of tertiary amine catalysts useful in the invention are triethylamine, triethylenediamine, dimethyl benzylamine, tetramethylethylenediamine, tetramethylbutylamine, pentamethyldiethylenetriamine, tributylamine, trioctylamine, triisopropanolamine, triethanolamine, N,N,N',N'-tetramethyl-1,3-butanediamine, 2,4,6-tris (dimethylaminomethyl)phenol, N,N-dimethyl cyclohexylamine, 1,3,5-tris-(N,N-dialkylaminoalkyl)-s-hexahydrotriazines and the water or alkylene oxide adduct thereof, N-alkylmorpholines such as N-ethylmorpholine and N-methylmorpholine, piperazine and piperazine derivatives such as N-methylpiperazine and N-methyl-N'-dimethylaminoethylpiperazine; imidazole such as 1,2-dimethylimidazole. Metallic compounds useful as catalysts include those of bismuth, lead, tin, titanium, iron, antimony, uranium, cadmium, cobalt, thorium, aluminum, mercury, zinc, nickel, cerium, molybdenum, vanadium, copper, manganese, zirconium, etc.

Some examples of these metal catalysts include bismuth nitrate, lead 2-ethylhexoate, lead benzoate, lead oleate, dibutyltin dilaurate, tributyltin, butyltin trichloride, stannic chloride, stannous octoate, stannous oleate, dibutyltin di(2-ethylhexoate), ferric chloride, antimony trichloride, antimony glycoxolate, tin glycoxolate, etc. Certain catalysts are known to show some selectivity towards promoting the reaction of isocyanate with water. These catalysts are known by the term urethane blowing catalysts, due to the associated generation of nascent carbon dioxide. Exemplary of such catalysts are pentamethyldiethylenetriamine-N,N-dimethyl-N-aminoethylmorpholine and bis-(N,N-dimethylaminoethyl)ether and their formate salts. An amine and organometallic compound are often used together in the polyurethane reaction, so mixtures of one or more of such catalysts can also be employed.

Catalysts known to promote the trimerization of isocyanate to give products containing an isocyanurate ring structure are employed in combination with urethane catalysts to enhance foam properties, especially softness. Catalysts which promote the polymerization of isocyanates giving products containing an isocyanurate ring structure have been widely described in the art; for example, GB Patent Nos. 809,809; 837,120; 856,372; 908,337; 1,104,394; 1,146,661; 1,184,893; 1,195,821; 1,217,097; 1,233,251; and 1,278,704. Representative trimerization catalysts include the quaternary ammonium compounds such as benzyl trimethylammonium hydroxide, the N-hydroxypropyl trimethylammonium salts formic acid and other onium compounds, alkali metal hydroxides such as potassium hydroxide, the alkali metal alkoxides such as sodium methoxide, the alkali metal acid salts of carboxylic acids, particularly the saturated aliphatic monocarboxylic acids having from 1 to 12 carbon atoms, such as sodium acetate, potassium acetate, potassium 2-ethylhexoate, potassium adipate and sodium benzoate.

Trimerization catalysts in general can be employed, exemplary of such are potassium glutamate, potassium acetate, sodium acetate, potassium carbonate, 2-hydroxypropyltrimethylammonium-2-ethylhexoate and 2-hydroxypropyltrimethylammonium formate. It is preferred to use trimerization catalysts which are blocked or delayed-action catalysts as this allows for better control of the system reactivity in addition to improving the foam quality, especially softness. Examples of such catalysts include 2-hydroxypropyltrimethylammonium 2-ethylhexoate, 2-hydroxypropyltrimethylammonium formate.

In one of the preferred embodiments of the invention, the blocked or delayed-action trimerization catalysts are used in combination with urethane catalysts, where at least one of the urethane catalysts is a urethane blowing catalyst and can be a blocked or delayed-action blowing catalyst. The urethane blowing catalyst can be advantageously used to improve the curing of the foam. The preferred urethane catalysts are generally the amines, particularly tertiary amines, a mixture of two or more amines, or a mixture of one or more amines with one or more metal catalysts, particularly an organic tin compound. Exemplary of the preferred urethane catalysts are stannous octoate, triethylenediamine, pentamethyldiethylenetriamine, N,N-dimethyl-N-aminoethylmorpholine and bis-(N,N-dimethylaminoethyl)ether and formate salts, N-methylmorpholine. In the preparation of polyurethane foams, the catalyst is employed in a catalytically effective amount, with the amine catalyst generally being employed in an amount from 0.05 to 5.0, preferably from 0.1 to 2.0 parts by weight per hundred parts of polyol composition. The metal catalysts are employed in smaller amounts from 0.01 to about 1.0 parts by weight per hundred parts of polyol composition.

The trimerization catalysts are employed in an amount sufficient to give a desired system reactivity and more especially softness of foam. Increasing amounts of trimerization catalyst provide for softer foam exhibiting lower compressive load deflection values. The trimerization catalysts are advantageously employed in an amount from 0.01 to 1.0, and preferably 0.05 to 0.5 part by weight per 100 parts polyol composition and may be used alone or in combination.

One or more trimerization catalysts can be employed with one or more urethane catalysts. Trimerization catalysts may also be replaced to a small extent with catalysts which catalyze carbodiimide formation for example 3-alkylphosphine oxide and other such like compounds as disclosed in U.S. Pat. No. 4,424,288.

THE BLOWING AGENT

In this present invention, it is an objective to prepare polyurethane foams where it is preferred not to use CFC's or other volatile organic liquids as the major portion of the blowing agent, though they may be used optionally in small, minor quantities as supplementary blowing agent to the water generated carbon dioxide when it is to the benefit of the desired foam properties. Supplementary blowing agents useful in the preparation of isocyanate derived foams are well-known in the art and reference is made thereto for the purpose of the present invention.

Suitable blowing agents include liquids or liquefied gases which generate a gas by decomposition or reaction with one or more of the components in the foaming mixture or which vaporize at or below the reaction conditions (i.e., temperature and pressure created by the exothermic reaction). In general the liquids and the liquefied gases advantageously employed are materials having a boiling point from $-80°$ C. to $100°$ C., preferably from $0°$ C. to $75°$ C. Representative supplementary blowing agents useful herein include the halogenated, preferably the chlorinated and/or the fluorinated hydrocarbons such as tetrafluoromethane, bromotrifluoromethane, chlorotrifluoromethane, dibromodifluoromethane, dichlorodifluoromethane, trichlorofluoromethane, hexafluoroethane, 1,2,2-trichloro-1,1,2-trifluoroethane, 1,1,2,2-tetrachloro-1,2-difluoroethane, 1,2-dibromo 1,1,2,2-tetrafluoroethane, 1,2,2-tribromo-1,1,2-trifluoroethane, octafluoropropane, decafluorobutane, hexafluorocyclopropane, 1,2,3-trichloro-1,2,3-trifluorocyclopropane, octafluorocyclobutane, 1,2-dichloro-1,2,3,3,4,4-hexafluorocyclobutane, 1,2,3,4-tetrachloro-1,2,3,4-tetrafluorocyclobutane, trichloroethylene, trichloroethane, chloroform, dichloroethane, carbon tetrachloride and low boiling hydrocarbons including alkanes and/or alkenes such as butane, pentane, hexane, etc.

In the preferred embodiment of this invention the blowing agent for the preparation of soft flexible foam is carbon dioxide generated from the reaction of isocyanate with water. The water is generally used in an amount of 1 to 10 parts by weight per 100 parts polyol composition. Sufficient amounts of blowing agent are used to give foams of the desired densities. The water generated carbon dioxide accounts for the major portion of the blowing agent required to produce foam of the desired density. At least 50 percent, preferably at least 60 percent and more preferably at least 75 percent of the total blowing agent requirement needed for the production of the foam can be derived from the reaction of water with isocyanate to generate carbon dioxide. If necessary, the remainder of the blowing agent requirement for the production of the foam can be provided by one or more of the suitable blowing agents listed. Preferred supplementary blowing agents are the soft chlorofluorocarbons.

THE SURFACTANT

The reaction mixture may also contain a surfactant or stabilizer or other cell size control agent. Such materials are well-known in the art and reference is made thereto for the purpose of the present invention. In general, representative of such foam surfactants are alkoxysilanes, polysilylphosphonates, polydimethylsiloxanes, the condensates of ethylene oxide with a hydrophobic base formed by condensing propylene oxide with propylene glycol, the alkylene oxide adducts of ethylenediamine, and the polyoxyalkylene esters of long chain fatty acids and sorbitan, and (siloxaneoxyalkylene) block copolymers. Preferred of such materials are the siloxaneoxyalkylene block copolymers. Illustrated block copolymers are described in U.S. Pat. Nos. 2,834,748; 2,917,480; 3,505,377; 3,507,815; 3,563,924 and 4,483,894.

Examples of suitable surfactants are the "Tegostab" products Tegostab B-4113, B-4380, and B-8681 sold by Goldschmidt and the surfactant DC-5043, sold by Dow Corning Corporation. Examples of suitable stabilizers are Tegostab BF-2270, BF-2370, BF-4900 and B-3136 sold by Goldschmidt and the Dow Corning Corporation products DC-190 and DC-198. The foam stabilizer, surfactant is generally employed in amounts from about 0.05 to 5.0, preferably from 0.1 to 2.0, parts by weight per one hundred parts of hydroxyl compounds of the polyol composition.

THE ADDITIVES

In addition to the previously described components, the foaming mixture can optionally contain any of a variety of additives commonly employed in the preparation of flexible urethane foams. Representatives include fire-retardant agents, fillers, dyes, pigments, antioxidizing agents, fungicides and the like. Cross-linkers used to modify foam properties can also be incorporated in the reacting mixture. Representative cross-linkers are alkylamines, diamines, glycerine, diethanolamine and the like.

PREPARATION OF FLEXIBLE FOAM

The components just described may be employed to produce soft flexible polyurethane and polyisocyanurate foam. The polyol composition comprising the mono-alcohol and polyol components is reacted with an appropriate amount of organic polyisocyanate in the presence of a blowing agent, catalysts, surfactant, additives, fillers, etc.

The flexible foams prepared here may be made in a one-step process by reacting all the ingredients together at once or foams can be made by the so-called "quasi-prepolymer method." In the one-shot process, where foaming is carried out in machines, the active hydrogen-containing products, catalysts, surfactants, blowing agents and optional additives may be introduced through separate pipes to the mixing head where they are combined with the polyisocyanate to give the polyurethane-forming mixture. The mixture may be poured or injected into a suitable container or mold as required. For use of machines with a limited number of component lines into the mixing head, a premix of all the components except the polyisocyanate (and supplementary blowing agent when a gas is used) to give a polyol formulation, can be advantageously employed. This simplifies the metering and mixing of the reacting components at the time the polyurethane-forming mixture is prepared.

Alternatively, the foams may be prepared by the so-called "quasi-prepolymer method." In this method a portion of the polyol component is reacted in the absence of catalysts with the polyisocyanate component in proportion so as to provide from about 10 percent to about 30 percent of free isocyanate groups in the reaction product based on the weight of prepolymer. To prepare foam, the remaining portion of the polyol is added and the components are allowed to react together in the presence of catalysts and other appropriate additives such as blowing agent, surfactant, etc. Other additives may be added to either the prepolymer or remaining polyol or both prior to the mixing of the components, whereby at the end of the reaction a flexible polyurethane foam is provided.

In any event, the urethane, isocyanurate foams prepared in accordance with this invention are flexible products advantageously having densities of from 6 to 500, preferably from 6 to 200 and more preferably from 6 to 100 kilograms per cubic meter. The foams can exhibit properties equivalent to or better than comparative foams prepared using environmentally harmful blowing agents.

Such foams as prepared by the process according to the invention are used, for example, as upholstery materials, mattresses, packing materials, films for laminating purposes and as insulating materials.

The process according to the invention is illustrated, but not intended to be limited, by the following experiments. Unless otherwise specified, all quantities are in parts by weight.

In the examples, the properties of the foams were determined in accordance to the following standard test procedures; resilience ASTM D 3574-81, modulus and compressive load deflection (CLD) DIN 53577, tensile strength and elongation DIN 53571, tear resistance DIN 53515.

The following abbreviations are employed in the examples:

Polyol A is an ethylene oxide, propylene oxide adduct of glycerine having an hydroxyl number of 55, and a primary OH content of 40 percent.

Polyol B is an ethylene oxide, propylene oxide adduct of glycerine having an hydroxyl number of 35, and primary OH content of 82 percent.

Mono-alcohol A is a mixed feed ethylene oxide, propylene oxide adduct of triethylene glycol monomethyl ether having a hydroxyl number of 37.5, molecular weight 1400.

NIAX A1: bis(dimethylaminoethyl)ether sold by Union Carbide Corp.
Sn-oct: stannous octoate
DABCO 33 LV: triethylenediamine 33 percent in dipropylene glycol sold by Air Products
DABCO XDM: N,N-dimethylethyl-N-morpholine sold by Air Products
NMM: N-methylmorpholine
Catalyst A: potassium carbonate*, 10 g/100 g water
DABCO TMR: 2-hydroxypropyltrimethylammonium 2-ethylhexoate* sold by Air Products
DABCO TMR-2: 2-hydroxypropyltrimethylammonium formate* sold by Air Products
Tegostab BF 2370: silicone surfactant sold by Th. Goldschmidt
Tegostab BF4900: silicone surfactant sold by Th. Goldschmidt
Freon R-11 A: trichlorofluoromethane sold by Dupont
DEA: diethanolamine

*Isocyanate Trimerization Catalysts

For all experiments, the polyisocyanate employed is an 80:20 mixture of the 2,4- and 4,4-toluene diisocyanate isomers.

COMPARATIVE EXAMPLES A TO D

The comparative foams are prepared employing the indicated products and formulations as shown in Table 1.

Foam properties are indicated in Table 2.

The modulus value indicated in Table 2 is the ratio:

$$\frac{CLD \text{ at } 65\%}{CLD \text{ at } 25\%}$$

The larger the value, the greater the load bearing support offered by the foam.

The guide factor given in Table 2 can be calculated according to the following equation:

The guide factor may be considered as a normalized hardness and allows for comparison of different foam samples where there may be variation in densities. The lower the value, the softer the foam.

$$\frac{CLD \text{ at } 40\% \text{ (Kpa)}}{\text{Foam density (Kg/M}^3\text{)}} \times 10.$$

Comparative Examples A to D illustrate respectively the foam properties obtained when Freon-11 is used in blowing the foam, the change and loss in foam properties when using only water as the blowing agent, and the comparative foam properties when water blowing is combined with either a foam prepared in the presence of a mono-alcohol or trimerization catalyst.

TABLE 1

| Formulation | A* | B* | C* | D* |
|---|---|---|---|---|
| Polyol A | 100 | 100 | 85.75 | 100 |
| Mono-alcohol A | / | / | 14.25 | / |
| Tegostab BF2370 | 1.5 | 1.5 | 1.5 | / |
| Tegostab BF4900 | / | / | / | 1.1 |
| Sn-oct | 0.1 | 0.1 | 0.1 | 0.05 |
| NMM | 0.3 | 0.3 | 0.3 | / |
| NIAX A1 | / | / | / | 0.04 |
| DABCO 33LV | 0.3 | 0.3 | 0.3 | / |
| DABCO XDM | / | / | / | 0.15 |
| DABCO TMR | / | / | / | 0.1 |
| FREON-11 | 6.0 | / | / | / |
| Water | 3.6 | 4.0 | 4.0 | 4.5 |
| Index | 100 | 100 | 100 | 100 |

*Not an example of this invention

EXAMPLES 1 TO 4

TABLE 2

| Foam Properties | A* | B* | C* | D* |
|---|---|---|---|---|
| Density(Kg/M$^3$) | 25.7 | 25.8 | 25.5 | 25 |
| CLD at 40% (KPa) | 2.47 | 3.5 | 2.4 | 2.2 |
| Tensile Strength (KPa) | 123 | 182 | 117 | 140 |
| Elongation % | 260 | 320 | 290 | 250 |
| Tear Resistance (N/M) | 640 | 678 | 680 | 700 |
| Resilience % | 44 | 37 | 40 | / |
| Hysteresis % | 27.8 | 29.9 | 29.3 | 28.5 |
| Modulus | 2.17 | 2.15 | 2.35 | 2.4 |
| Guide factor | 0.96 | 1.35 | 0.95 | 0.88 |

*Not an example of this invention

In accordance with the process of this invention, foams are prepared in the presence of mono-alcohols and trimerization catalysts. The products and formulations used to prepare the foams are shown in Table 3 and the properties of the products obtained in Table 4. As can be seen from Table 4, the soft flexible polyurethane foams prepared exhibit properties which are equivalent to or better than the comparative foams.

Example 2 displays foam properties equivalent to Comparative Example A and as seen from the guide factor is significantly softer.

EXAMPLE 5

This example illustrates the increasing softness of the foam produced according to the process of the invention with the increasing quantity of trimerization catalyst. Foams are prepared according to the formulation of Example 2 (with trimerization catalyst levels as indicated below). Results are tabulated below.

| DABCO TMR-2 (pphp) | Foam Density | CLD at 40% (KPa) | Guide Factor |
|---|---|---|---|
| 0.05 | 25 Kg/M$^3$ | 1.8 | 0.74 |
| 0.15 | 25 | 1.6 | 0.64 |
| 0.25 | 25 | 1.4 | 0.56 | pphp = parts per 100 parts total polyol composition

TABLE 3

| Formulation | 1 | 2 | 3 | 4 |
|---|---|---|---|---|
| Polyol A | 45 | 45 | 45 | 45 |
| Polyol B | 35 | 35 | 35 | 35 |
| Mono-alcohol A | 20 | 20 | 20 | 20 |
| Tegostab BF2370 | / | 1.2 | 1.3 | 1.2 |
| Tegostab BF4900 | 1.1 | / | / | / |
| Sn-oct | 0.08 | 0.08 | 0.08 | 0.08 |
| NIAX A1 | 0.04 | 0.1 | 0.1 | 0.05 |
| DABCO XDM | 0.15 | 0.15 | 0.3 | 0.05 |
| DABCO TMR | 0.1 | / | / | / |
| DABCO TMR-2 | / | 0.1 | / | / |
| Catalyst A | / | / | 0.1 | 0.1 |
| DEA | / | / | / | 0.2 |
| Water | 4.5 | 4.0 | 5.5 | 4.5 |
| Index | 100 | 100 | 81 | 100 |

TABLE 4

| Foam Properties | 1 | 2 | 3 | 4 |
|---|---|---|---|---|
| Density(Kg/M$^3$) | 25.0 | 28.3 | 23.1 | 28.3 |
| CLD at 40% (KPa) | 1.8 | 1.8 | 1.5 | 2.4 |
| Tensile Strength (KPa) | 85 | 92 | 80 | 108 |
| Elongation % | 230 | 250 | 240 | 240 |
| Resilience % | 44 | 44 | 39 | 48 |
| Hysteresis % | 29.7 | 29.2 | 29.3 | 31.4 |
| Modulus | 2.6 | 2.37 | 2.7 | 2.6 |
| Guide Factor | 0.72 | 0.63 | 0.65 | 0.84 |

What is claimed is:

1. A process for preparing a flexible polyurethane foam by reacting a polyisocyanate with a polyol composition containing at least two different hydroxyl compounds in the presence of a trimerization catalyst and a blowing agent characterized in that the polyol composition comprises at least one hydroxyl compound which is a polyol having a hydroxyl number of from 20 to 120 and at least one hydroxyl compound which is a polyether monoalcohol, and in that the trimerization catalyst is present in from 0.01 to 1.0 parts by weight per 100 parts polyol composition and is used in admixture with a urethane catalyst, and in that at least 50 percent of the total blowing requirement to prepare the foam results from the reaction of water and isocyanate.

2. The process according to claim 1 wherein the polyol is a polyether polyol and is a reaction product of one or more alkylene oxides with an initiator containing from two to eight active hydrogens.

3. The process according to claim 1 wherein the mono-alcohol is a reaction product of one or more alkylene oxides with an initiator containing one active hydrogen.

4. The process according to claim 3 wherein the mono-alcohol has an equivalent weight of 800 to 3000.

5. The process according to claim 1 wherein the major portion of the blowing of the foams results from the reaction of water present from 1 part to 10 parts by weight per 100 parts of said polyol composition.

6. The process according to claim 1 wherein the trimerization catalyst is a delayed-action catalyst which during the process of reacting the polyisocyanate with the polyol composition becomes active.

7. The process according to claim 1 wherein the urethane catalyst includes at least one urethane blowing catalyst.

8. The process according to claim 1 wherein the polyol composition comprises a mono-alcohol, from about 0.1 to about 40 percent by weight of said polyol composition.

9. The process according to claim 1 wherein the trimerization catalyst is one or more compounds selected from the group consisting of potassium glutamate, potassium acetate, sodium acetate, potassium carbonate, potassium 2-ethylhexoate, potassium adipate, 2-hydroxypropyltrimethylammonium-2-2ethylhexoate and -hydroxypropyltrimethylammonium formate.

10. A flexible polyurethane foam which is the reaction product of a polyisocyanate with a polyol composition containing active hydrogen atoms in the presence of a trimerization catalyst and a blowing agent characterized in that the polyol composition comprises at least one polyol component having a hydroxyl number of from 20 to 120 and at least one polyether mono-alcohol component, in that the trimerization catalyst is used in admixture with a urethane catalyst, and wherein the mono-alcohol is present in from about 0.1 to 40 percent by weight of said polyol composition and wherein the polyisocyanate is present in an amount to provide from 0.8 to 1.3 isocyanate groups per active hydrogen atom.

11. A soft flexible polyurethane foam as in claim 10 wherein the polyisocyanate comprises toluene diisocyanate.

12. A soft flexible polyurethane foam as in claim 10 wherein the polyisocyanate comprises polymethylene polyphenyl isocyanate.

UNITED STATES PATENT AND TRADEMARK OFFICE
CERTIFICATE OF CORRECTION

PATENT NO. : 4,981,880

DATED : January 1, 1991

INVENTOR(S) : Christain M. Lehmann and Michael A. P. Gansow

It is certified that error appears in the above-identified patent and that said Letters Patent is hereby corrected as shown below:

Column 9, line 22, the word "isocyanate" should correctly read --isocyanato--.

Column 12, Claim 9, line 49, "and -hydroxypropyltrimethylammonium formate" should correctly read --2-hydroxypropyltrimethylammonium formate--.

Signed and Sealed this

Sixth Day of October, 1992

Attest:

DOUGLAS B. COMER

Attesting Officer    Acting Commissioner of Patents and Trademarks